United States Patent [19]

Badia

[11] Patent Number: 4,624,706

[45] Date of Patent: Nov. 25, 1986

[54] WELD WIRE FROM EXTRUDED NICKEL CONTAINING POWDER

[75] Inventor: Frank A. Badia, Huntington, W. Va.

[73] Assignee: Inco Alloys International, Inc., Huntington, W. Va.

[21] Appl. No.: 751,053

[22] Filed: Jul. 2, 1985

[51] Int. Cl.$^4$ .............................................. C22B 15/00
[52] U.S. Cl. ........................................ 75/246; 148/24; 419/4; 419/23; 419/41; 419/67
[58] Field of Search .................. 419/4, 40, 23, 41, 26, 419/28, 3, 67; 75/122.1, 247, 246; 148/24

[56] References Cited

U.S. PATENT DOCUMENTS

| | | | |
|---|---|---|---|
| 2,289,787 | 7/1942 | Kaschke et al. | 75/22 |
| 2,719,786 | 10/1955 | Fredenburgh | 419/41 |
| 3,199,331 | 8/1965 | Allen | 72/253 |
| 4,391,772 | 7/1983 | Bonnor et al. | 419/23 |

OTHER PUBLICATIONS

Treatise on Powder Metallurgy, vol. II, by C. G. Goetzel, Interscience Publishers, Inc., New York, 1950, p. 568.
The Extrusion of Metals, by C. E. Pearson, John Wiley & Sons Inc., New York, 1944, p. 201.
Extruded Powder Metal Welding Rods, by F. C. Kelley and F. E. Fisher, The Iron Age, Dec. 19, 1946, pp. 68–72.

*Primary Examiner*—Stephen J. Lechert, Jr.
*Attorney, Agent, or Firm*—Edward A. Steen; Raymond J. Kenny

[57] ABSTRACT

A method for directly fabricating weld wire utilizing powder metallurgy techniques. Nickel containing powder, mixed into a slurry, is continuously extruded in an auger-type extrusion press into rod. The rod is consolidated to densities greater than about 91% theoretical density for subsequent rough handling.

7 Claims, No Drawings

WELD WIRE FROM EXTRUDED NICKEL CONTAINING POWDER

TECHNICAL FIELD

The instant invention relates to weld wire in general and, more particularly, to a nickel containing weld wire and an extrusion process for making the wire from metallic powder.

BACKGROUND ART

Presently, conventional weld wire is made from large cast ingots, e.g., 20 inches (50.8 cm) square by 90 inches (228.6 cm) long, which must be hot and cold rolled down to final size, e.g., ⅛ inch (0.32 cm) diameter wire. This is wasteful of manpower, energy and material. Also, certain desirable compositions for weld wire are difficult or impossible to process to wire by conventional ingot metallurgy. Furthermore, weld wires with low volume or low turnover rates can be wasteful of capital due to inventory costs.

Direct extrusion and consolidation of powder metallurgy (P/M) processed alloys would overcome the above difficulties. However, P/M extrusion techniques have not been adopted by the welding electrode industry. There appear to be only a few references applying P/M techniques to welding wire. And of these most deal with coating a conventionally wrought base wire by consolidating the alloy powder about the prefabricated wire. See for example *Treatise on Powder Metallurgy Volume II* by C. G. Goetzel, Interscience Publishers, Inc., New York 1950, page 568 and *The Extrusion of Metals* by C. E. Pearson, John Wiley & Sons Inc., New York 1944, page 201. The former reference refers to "an ingot iron base wire" and the latter reference briefly refers to "the preparation of special rods for arc welding" but does not give details.

An article that does present details is entitled "Extruded Powder Metal Welding Rods" by F. C. Kelly and F. E. Fisher, "The Iron Age" December 19, 1946, pages 68–72. 18-8 welding rods of moderate density (about 75%) were fabricated. These experimental rods are not believed to be able to withstand the rigors of modern, high speed, automated coating processes. Indeed, welding rods having densities below about 90% are not useful since they tend to break apart and decrease product yields below commercially acceptable levels.

SUMMARY OF THE INVENTION

Accordingly, there is provided a method for fabricating weld wire utilizing P/M techniques. What is proposed is the direct extrusion plus consolidation of near net diameter weld wire from a granulated P/M slurry. A screw (auger) type extruder is favored over the batch piston type since it more easily lends itself to continuous operation.

A granulated slurry consisting of pure nickel or nickel containing alloy powders, binders, lubricants and water is continuously extruded and consolidated into weld wire. Densities from about 91–99% theoretical density have been achieved.

PREFERRED MODE FOR CARRYING OUT THE INVENTION

A number of various P/M alloy systems were employed for fabricating weld wire. In general, the weldability i.e., operability, arc stability, slag removal, soundness, lack of weld porosity, etc., of the P/M rods were judged to be equivalent to the commercial material. Occasional problems encountered included incomplete slag coverage and start cracks. Incomplete slag coverage is believed to be due to a flat or concave weld bead contour in the P/M rods. This can be corrected by changes in flux composition. Start cracks may be related to weld bead composition. Strength and toughness of even less than fully dense P/M rods appear adequate to survive commercial flux coating operations provided that the density of the wire is at least about 95% theoretical density.

For the purposes of this specification the expression "nickel containing" means any elemental or alloy system that ranges (in weight percent) from about 28% to 100% nickel.

EXAMPLE I

P/M techniques were employed to make substantially pure nickel powder. A fifty kilogram heat of Nickel-200 powder (a product of Inco Alloys International, Inc.—the assignee) was water atomized in a conventional manner as follows:

Eight size #43 jets, 4 at 25° and 4 at 30°
0.296 inch (7.5 mm) diameter nozzle
Tundish preheated to 2200° F. (1204° C.)
Approximately 1500 pounds per square inch (10.3 MPa) water pressure
Argon tank flush The chemical analysis and powder size distribution are given in Tables I and II, respectively. Other atomized compositions can be envisaged, e.g., MONEL alloy 400 (MONEL is a trademark of the Inco family of companies.), cupro-nickel, etc. Also, the powders can be preblended mixed elemental powders, e.g., Ni—Cr, Ni—Al, Ni—Cb, etc., or combinations of atomized powders and mixed elementals. Water atomized powders, where applicable, are preferred over gas atomized powders from a cost and compressibility standpoint.

TABLE I

CHEMICAL ANALYSIS OF WATER ATOMIZED NICKEL POWDER (HEAT A)

| Mn | Si | Al | Ti | Fe | Cu | C | $O_2$ | $N_2$ | Ni |
|---|---|---|---|---|---|---|---|---|---|
| .27 | .06 | .09 | .11 | .14 | .13 | .014 | .11 | .002 | Balance |

TABLE II

POWDER SIZE DISTRIBUTION (HEAT A)

| Mesh Size | Wt. % |
|---|---|
| +100 | 15.0 |
| −100 +200 | 27.6 |
| −200 +325 | 21.9 |
| −325 | 35.5 |

Slurry Production. Ten pound (4.5 kg) batches were made up as follows in a twin blade Ross (trademark) mixer:

1. Blend 86.5 wt.%-100 mesh Ni powder, 3 wt.% ethyl cellulose binder and 0.5 wt.% zinc stearate lubricant for approximately 10 minutes.
2. Add 10 wt.% water and blend for approximately 20 minutes. The consistency of the mixture resembles that of a "heavy clay".

Other water-base binder systems envisaged include methyl cellulose or water glass. A solvent-base system could be diethylene glycol with polyvinylpyrrolidone as the binder. The levels of binders, lubricant and water should be kept as low as possible consistent with acceptable extrudability to minimize decomposition products during sintering.

Extrusion. The mixture was extruded using a laboratory size screw-type auger polymer press:
1. Auger diameter—0.75 inch (19.1 mm) diameter.
2. Auger length to diameter ratio—24:1.
3. Auger compression ratio—2:1.
4. Auger speed—34 rpm.
5. Die diameter—0.250 inch (6.4 mm).
6. Extrusion ratio—3:1.
7. Extrusion speed—2 Ft/min. (0.61 m/min.).
8. Barrel and die holder cooling—ice pack.
9. Green rod—39 g/ft. (130 g/m).
10. Air dry rod—36 g/ft. (120 g/m).
11. Rods—0.240 inch (6.1 mm) diameter × approximately 14 inch (35.6 cm) long.

It should be appreciated that the extrusion conditions would change accordingly when using a commercial size extruder and automated take-up devices to maximize product throughput. The terms "rod" and "wire" are used interchangeably.

Sinter. The rods were sintered at 2050° F. (1121° C.)/½–1 hr. in H$_2$. The sintered diameter was 0.230 inch (5.8 mm). Sintered densities are not meaningful, since all rods contained a hole down the center about 0.025 inch (0.64 mm) in diameter. Sintering temperatures, times and atmospheres, of course, will vary depending upon metallic powder content.

The central hole in the rod is a result of the heat generated within the die. The extruded material expands due to the heat and, as a consequence of the radial expansion, a void is formed. This hole may be eliminated by retooling the die and with controlled cooling of the die holder and barrel. The elimination of the center hole will result in increased overall strength and toughness.

Consolidation by Cold Swaging. All 0.230 inch (5.8 mm) diameter sintered rods were cold swaged to 0.190 inch (4.8 mm) diameter in one pass, a cold reduction of 32%. This cold reduction was not sufficient to close up the hole in the center. After an anneal at 1750° F. (954° C.)/20 min./H$_2$, some rods were cold swaged to 0.160 inch (4.1 mm) diameter in two passes. At this point the center hole was closed and the rods were 96% of theoretical density. Some rods were annealed again at 1750° F. (954° C.)/20 min./H$_2$ and cold swaged to 0.155, 0.152 or 0.149 (3.9 mm, 3.8 mm, 3.7 mm) in two passes. At this point, the densities were 97, 98 or 99% of theoretical respectively. The conditions of the rods are listed in Table III.

TABLE III

| | NICKEL WELD RODS EVALUATED | | | |
|---|---|---|---|---|
| | CONDITION | | NUMBER OF | |
| SAMPLE | TOTAL CW % | FINAL CW % | INTERMEDIATE ANNEALS | CENTERLESS GROUND TO |
| 4 | Control | | — | 0.125 inch (3.2 mm) diameter |
| 5 | 57 | 13 | 2 | 0.125 inch (3.2 mm) diameter |
| 6 | 56 | 20 | 2 | 0.125 inch (3.2 mm) diameter |
| 7 | Control | | — | 0.155 inch (3.9 mm) diameter |
| 8 | 52 | 32 | 1 | 0.155 inch (3.9 mm) diameter |
| 9 | 52 | None - final 1300° F. (704° C.)/ 20 min. Anneal | 1 | 0.155 inch (3.9 mm) diameter |
| 10 | 53 | 15 | 2 | 0.155 inch (3.9 mm) diameter |

Note:
CW = Cold Work
Samples 4 and 7 are commercial NI-ROD welding electrodes comprising about 95% nickel, 3% iron, and 1% carbon. (NI-ROD is a trademark of the Inco family of companies.)

Weld Rod Evaluation

Flux Coating. Most of the extruded rods were flux coated using a commercial proprietary mixture on a laboratory extruder. Eight sample 5 rods were flux coated on a commercial extruder. One rod broke at a defect. Thirteen and seven rods from samples 10 and 8, respectively, were flux coated on the commercial unit with no difficulties. It appears that final densities on the order of 96 to 99% of theoretical give sufficient strength for "handleability" during flux coating. The flux coated rods were baked in a force air furnace at 800° F. (427° C.) for approximately 1½ hours.

Single Bead-On-Plate. First it was shown that the 0.125 inch (3.2 mm) and 0.155 inch (3.9 mm) diameter laboratory produced rods were equivalent to commercially produced rods via single bead-on-plate tests on both ductile and gray cast iron. Weld settings were 110 amps and 22 volts and 150 amps and 23 volts for 0.125 (3.2 mm) and 0.55 (3.9 mm) inch diameter rods, respectively.

Control vs. P/M Rods 0.125 Inch (3.2 mm) Diameter. The P/M rods (Samples 5 and 6) were judged to be essentially equivalent in weldability to the control NI-ROD welding electrode (Sample 4), except for slag coverage, i.e., 95% vs. 100% coverage for the control. This was seen in both ductile and gray cast iron. This incomplete coverage at bead edges may be related to the observation that the experimental rod weld beads have a tendency to be flat or concave rather than convex. Convexity in the weld bead can be achieved by changes in the flux composition or welding conditions.

Control vs. P/M 0.125 Inch (3.2 mm) Diameter. In the case of gray cast iron, slag coverage of the P/M rods (Samples 8, 9 and 10) was only about 70% whereas on ductile iron it was 100%. This behavior, which does not pose a problem, has been seen in commercial rods. The reason for this phenomenon is not fully understood.

Fillet Weld 0.125 Inch (3.2 mm) Diameter. In an unrestrained fillet weld on ductile iron, a start crack was seen in the P/M beads (Samples 5 and 6). Otherwise, the weld deposits were equivalent to the control rod (Sample 4). In a restrained condition, a start crack was also seen in both P/M rods.

Fillet Weld 0.155 Inch (3.9 mm) Diameter. In an unrestrained fillet weld on ductile iron no cracks were observed. However, in a restrained fillet weld a start crack was noted in the P/M beads (Samples 8 and 9), and a centerline crack in the P/M beads (Samples 9 and 10). The weld beads were concave which can promote centerline cracks in a restrained fillet weld. When the welding conditions were changed to achieve a convex weld bead in the P/M beads, centerline cracks were avoided. Occasional start cracks were still visible. However, they are not uncommon and are not considered detrimental to the integrity of the weld.

Triple Bead-On-Steel-Plate. All P/M rods along with the control rods at both diameters were subjected to a triple bead-on-plate test for a porosity evaluation. Operability of the P/M rods was judged equivalent to the controls; no weld defects were noted. The plates were X-rayed at a 170 volt, 10 milliamp, 2 minute exposure using fine grained Kodak (trademark) "M" film. All the welds were free of porosity except for a 0.125 inch diameter commercial NI-ROD welding electrode control; it contained 13 pores.

EXAMPLE II

In view of the successful results with the above essentially pure nickel system, attention was directed towards extruding MONEL nickel-copper alloy weld wire via P/M techniques. (MONEL is a trademark of the Inco family of companies.)

Weld wire made via the extrusion of granulated MONEL alloys 187 (hereinafter P/M 187) and 190 (hereinafter P/M 190) powder slurries and consolidated to 91–94% of theoretical density are evaluated below. The evaluation consisted of (1) overall weldability characteristics, (2) bend and tensile testing, (3) weld soundness, and (4) chemical analysis.

In general, the weldability, i.e., operability, arc stability, slag removal, soundness, etc., of the P/M 187 core wire and P/M 190 core wire was judged to be equivalent to the commercial control rods. In spite of the high oxygen in the P/M rods, low oxygen levels were found in the weld deposits of both control and P/M rods. Bend and tensile test results on butt welds showed equivalent properties. In the 91 to 94% range of theoretical density (TD), "handleability" of the P/M weld rods was judged to be unsatisfactory for subsequent high speed automated handling. As in the case of the pure nickel P/M welding rods, about 95 to 100% of theoretical density is satisfactory.

Modern high speed welding rod handling devices are capable of ejecting rods at the rate of 600 per minute. Unless the rod is sufficiently dense to stand up to such punishment ("handleability") the rod will undoubtedly break. In tests, some rods having densities below about 95% broke when manhandled. This is not to say that the welding characteristics of such rods were unsatisfactory. Rather, if automated handling is contemplated, these higher densities (equal to or greater than 95%) are preferred.

The nominal composition of MONEL Welding Electrode 187 includes about 32% nickel, 65% copper and 2% manganese. The nominal composition of MONEL Welding Electrode 190 includes about 65% nickel, 30.5% copper and 3% manganese.

A MONEL alloy 187 fifty kilogram heat was water atomized under similar circumstances as in Example I. The pouring temperature was 2700° F. (1481° C.). The chemical analysis and powder size distribution are given in Tables IV and V respectively.

TABLE IV

CHEMICAL ANALYSIS OF MONEL ALLOY 187 WATER ATOMIZED (HEAT A)

| WT. % | | | | | | | |
|---|---|---|---|---|---|---|---|
| Ni | Mn | Si | Ti | C | $O_2$ | $N_2$ | Cu |
| 28.5 | 0.42 | 0.01 | 0.01 | 0.005 | 0.095 | 0.003 | Bal |

TABLE V

POWDER SIZE DISTRIBUTION (HEAT A)

| Mesh Size | Wt. % |
|---|---|
| +100 | 15.6 |
| −100 +200 | 37.6 |
| −200 +325 | 18.1 |
| −325 | 28.7 |

A MONEL alloy 190 fifty kilogram heat was water atomized as above except the pouring temperature was 2775° F. (1524° C.). Some nozzles blockage occurred. This points up the need to blend back the required additions of Mn, Al and/or Ti for weldability, which can create nozzle blockage problems in both cupro-nickel and nickel-copper alloys. As will be seen, this approach proved satisfactory.

The chemical analysis is given in Table VI. The powder size distribution is not given since it would not be representative due to nozzle blockage. However, under normal circumstances it would approximate MONEL alloy 187 powder (Table V).

TABLE VI

CHEMICAL ANALYSIS OF MONEL ALLOY 190 WATER ATOMIZED (HEAT B)

| Ni | Mn | Si | Ti | C | $O_2$ | $N_2$ | Cu |
|---|---|---|---|---|---|---|---|
| 69.5 | 0.45 | 0.03 | 0.01 | 0.01 | 0.087 | 0.004 | Bal |

Slurry Production. The dry powders were first blended in a jar mill containing bent wires for approximately one hour. In normal practice, dry blending would be done in a V-cone blender fitted with an intensifier bar. The blend was transferred to a twin blade Ross mixer, water added, and mixed for approximately 20 minutes. The consistency of the mixture resembles that of a "heavy clay". The details of the slurry production are given below.

| | Weight (grams) |
|---|---|
| MONEL ALLOY 187 | |
| −100 mesh atomized powder | 2387.75 |
| Ni - 25 Ti powder (blended back) | 100.5 |
| Mn powder (blended back) | 8 |
| Fe powder (blended back) | 3.75 |
| | 2500.00 |
| ethyl cellulose (3 wt. %) | 90.00 |
| Zn stearate (.5 wt. %) | 15.00 |
| water (13 wt. %) | 395.00 |
| | 3000.00 |
| MONEL ALLOY 190 | |
| −100 mesh atomized powder | 2420.00 |
| Ti powder (blended back) | 37.5 |
| Al powder (blended back) | 30. |
| Mn powder (blended back) | 12.5 |
| C powder (blended back) | .5 |
| | 2500.5 |
| ethyl cellulose (3 wt. %) | 90. |

-continued

| | Weight (grams) |
|---|---|
| Zn stearate (.5 wt. %) | 15. |
| water (13 wt. %) | 395. |
| | 3000.5 |

Extrusion. As in Example I above, the mixtures were extruded in a continuous screw-type auger polymer press. The physical details of the processes and resultant wire were identical. See Example I for the extrusion and wire parameters.

Sinter. The air dried P/M 187 and 190 wires were batch sintered at 2050° F. (1121° C.)/1 hr. in $H_2$. After sintering, the rod diameters were approximately 0.225-inch (5.7 mm). Sintered densities are not meaningful, since as in the case of Example I, all rods contained a hole down the center of about 0.025 inch (0.64 mm) in diameter.

Consolidation by Cold Swaging. All 0.225 inch (5.7 mm) diameter P/M rods were cold swaged to 0.188 inch (4.8 mm) diameter in one pass, a cold redution of 30%. This cold reduction was not sufficient to close up the hole in the center. After an anneal at 1730° F./20 min./$H_2$, the rods were cold swaged to 0.158 inch (4 mm) diameter in two passes, a cold reduction of 28%. They were then centerless ground to 0.155 inch (0.39 mm) diameter. At this point, the densities were 94 and 91% of theoretical for MONEL Welding Electrodes 187 and 190, respectively. Process conditions for the rods are given in Tables VII and VIII. An additional densification step (such a final cold swaging operation) is required to boost the densities to or above 95% theoretical density. This will permit fully automated handling.

TABLE VII

P/M WELDING ELECTRODE 187 WELD RODS EVALUATED

| | CONDITION | | | |
|---|---|---|---|---|
| SAMPLE | TOTAL CW - % | FINAL CW - % | NO. OF ANNEALS[1] | % - T.D. |
| 10 | Control | | — | 100 |
| 11 | 51 | 28 | 1 | 94 |

[1]1730° F. (943° C.)/20 min./$H_2$

TABLE VIII

P/M WELDING ELECTRODE 190 WELD RODS EVALUATED

| | CONDITION | | | |
|---|---|---|---|---|
| SAMPLE | TOTAL CW - % | FINAL CW - % | NO. OF ANNEALS[1] | % - T.D. |
| 12 | Control | | — | 100 |
| 13 | 51 | 28 | 1 | 91 |

[1]1730° F. (943° C.)/20 min./$H_2$

WELD ROD EVALUATION

Flux Coating. All the bare rods were flux coated on a laboratory extruder. About twenty rods of both controls and experimental P/M compositions were produced. All flux coated rods were baked in a forced air furnace at 800° F. (427° C.) for approximately 1½ hours.

Single Bead-on-Plate. Operability, including slag coverage of the experimental P/M and control MONEL Welding Electrodes 187 and 190 rods, was judged to be essentially equivalent. All bead contours were convex. Weld settings were 125 amps and 24 volts.

Triple Bead-on-Plate. All welded plates appeared visually satisfactory. The weld interfaces made with the control rods appeared slightly cleaner than those of the P/M rods. Some slag puddles which resembled low melting non-metallic eutectics were noted. Previous experience suggested that they may be complex fluorides which are not considered harmful. Results of an X-ray evaluation are given in Table IX. Note that the P/M 190 core wire weld exhibited many fine "non-relevant" pores which are not considered defects. Subsequent tensile and bend tests showed that in fact they were not harmful.

TABLE IX

X-RAY EVALUATION OF TRIPLE BEAD-ON-PLATE

| Weld ID | Results |
|---|---|
| Control MONEL alloy 187 | 2 pores |
| P/M 187 | 2 pores |
| Control MONEL alloy 190 | 1 pore |
| P/M 190 | No pores - about 50 "non-relevant" pores 0.025 inch (.64 mm) diameter. |

Butt Weld. The welds were laid down in an open V-shaped trough formed between two plates with a backing plate covering the smaller opening (the bottom of the "V") of 0.25 inches (6.4 mm). The weld settings were 135 amps, 24 volts for the P/M 187 alloy and the control MONEL alloy 187 wire and 140 amps, 24 volts for the P/M 190 alloy and the control MONEL alloy 190 wire. Each had a six bead deposit. The plates, 0.375 inches (9.5 mm) thick, were matching compositions.

The control MONEL alloy 190 core wire plate exhibited clean bead deposits. The initial bead deposits were not as clean in the case of the P/M core wire, but did "clean up" in the latter passes. This may be due to dilution effects, i.e., dilution is less in subsequent passes. After two passes, subsequent bead surfaces were clean for the control MONEL alloy 187 core wire butt weld. However, even after six passes, the bead surfaces for the P/M 187 core wire were slightly discolored. Although not considered a serious drawback, the reason for the discoloration is unknown.

Bend Tests. The butt welds above were subjected to both transverse face and side bends. Both were bent 180° over a 1½ inch (38.1 mm) diameter mandrel yielding a 2T bend. Visual and X-ray inspection showed no fissures for either the experimental P/M or control welds.

Tensile Tests. Strip tensile specimens were machined from the 0.375 inch (9.5 mm) thick butt welds. Test gauge dimensions measured ⅜ inch (9.5 mm) thick × ½ inch (12.7 mm) wide × 2 inches (51 mm) long. Tensile test results are given in Table X. As is shown, the results are comparable, and meet specifications.

TABLE X

TENSILE RESULTS ON BUTT WELDS[1]

| Weld | Ultimate Tensile Strength- psi (kPa) | Yield 0.2% Strength- psi (kPa) | % Elongation 2 inches (5.1 cm) | Failure Location |
|---|---|---|---|---|
| Control 187 | 56.5 (383) | 25.6 (176) | 31 | Parent Metal |
| P/M 187 | 54.0 (372) | 28.1 (194) | 31 | Parent Metal |
| Specification | 50.0 (345) | 20.0 (138) | 30.0 | — |
| Control 190 | 76.9 (530) | 39.3 (270) | 26.5 | Weld |
| P/M 190 | 82.9 (572) | 37.6 (259) | 34.5 | Weld |
| Specification | 70.0 (483) | 30.0 (207) | 30.0 | — |

[1]Strip tensile specimen.

CHEMICAL ANALYSIS

P/M Weld Wires. Chemical analyses are given in Table XI. For the major elements, the levels are near or within the commercial specifications. Note, however, the high oxygen levels in the P/M weld wires. Although oxygen was not determined in the control weld rods, experience would indicate that they would be less than 0.01 wt. %. As is discussed below, the oxygen (probably introduced during the atomization step) is not deleterious.

TABLE XI

CHEMICAL ANALYSES OF P/M WELD WIRES[1]

| MONEL alloy | C | Mn | Fe | Si | Al | Ti | $O_2$ | Cu | Ni |
|---|---|---|---|---|---|---|---|---|---|
| P/M 190 | 0.19 | 1.20 | 0.20 | 0.16 | 1.04 | 1.89 | 0.26 | 27.97 | Bal |
| Specification | 0.03–1.0 | 0.7–1.3 | 1.0 max | 0.30 max | 1.0–1.4 | 1.3– | — | 28–32 | — |
| P/M 187 | 0.12 | 0.72 | 0.29 | 0.14 | 0.18 | 0.96 | 0.15 | Bal | 31.50 |
| Specification | 0.04 max | 0.5–1.0 | 0.15 max | 0.15 max | 0.20 max | 0.9–1.3 | — | — | 29–32 |

[1]Also contained trace amounts of S, Cr, Co, Mo, Cb, P, Zr, and Ca.

Weld Deposits. Chemical analyses are given in Table XII. Both the control and P/M 187 and 190 are comparable and within specifications. In spite of the high oxygen contents in the P/M weld rods, both the P/M and control weld deposits have low oxygen levels. In the case of the P/M weld rods, the oxygen is removed by the action of the flux coating.

TABLE XII

CHEMICAL ANALYSES OF WELD DEPOSITS[1]

| Weld | C | Mn | Fe | Si | Al | Ti | $O_2$ | Cu | Ni | S |
|---|---|---|---|---|---|---|---|---|---|---|
| P/M 187 | 0.02 | 2.23 | 0.82 | 0.47 | 0.03 | 0.11 | 0.010 | bal | 31.49 | 0.003 |
| Control 187 | 0.01 | 1.98 | 0.58 | 0.29 | 0.01 | 0.15 | 0.010 | bal | 31.01 | 0.004 |
| Specification | 0.05 max | 1.0–2.5 | 0.4–0.75 | 0.5 max | — | 0.5 max | — | — | 29. min | 0.025 max |
| P/M 190 | 0.11 | 3.41 | 0.52 | 0.79 | 0.14 | 0.52 | — | bal | 67.44 | 0.002 |
| Control 190 | 0.07 | 3.11 | 0.58 | 0.63 | 0.13 | 0.50 | — | bal | 65.26 | 0.003 |
| Specification | 0.15 max | 4.0 max | 2.5 max | 1.0 max | 0.75 max | 1.0 max | — | — | 62–68 | 0.015 max |

[1]Also contained trace amounts of Cr, Co, Mo, Cb, P, and Mg.

While in accordance with the provisions of the statute, there is illustrated and described herein specific embodiments of the invention, those skilled in the art will understand that changes may be made in the form of the invention covered by the claims and that certain features of the invention may sometimes be used to advantage without a corresponding use of the other features.

The embodiments of the invention in which an exclusive property of privilege is claimed are defined as follows:

1. An extruded, powder metallurgy weld wire containing at least about 28% nickel and having a density of at least about 91% theoretical density, the weld wire made by:
   (a) providing nickel containing powder,
   (b) forming a slurry including the nickel containing powder,
   (c) continuously extruding the slurry into an extrudate,
   (d) conducting solid phase sintering of the extrudate, and
   (e) consolidating the extrudate to a predetermined wire diameter and a density of at least about 91% theoretical density.

2. The weld wire according to claim 1 wherein the nickel containing powder further includes materials selected from the group consisting of copper, chromium, aluminum and columbium.

3. The weld wire according to claim 1 wherein the nickel containing powder is water atomized.

4. The weld wire according to claim 1 wherein the slurry is extruded in an auger-type extrusion apparatus.

5. The weld wire according to claim 1 wherein the wire is coated.

6. The weld wire according to claim 1 wherein the nickel containing powder is at least about −100 mesh.

7. The weld wire according to claim 1 wherein the wire is consolidated to about 95%–100% theoretical density.

* * * * *